UNITED STATES PATENT OFFICE.

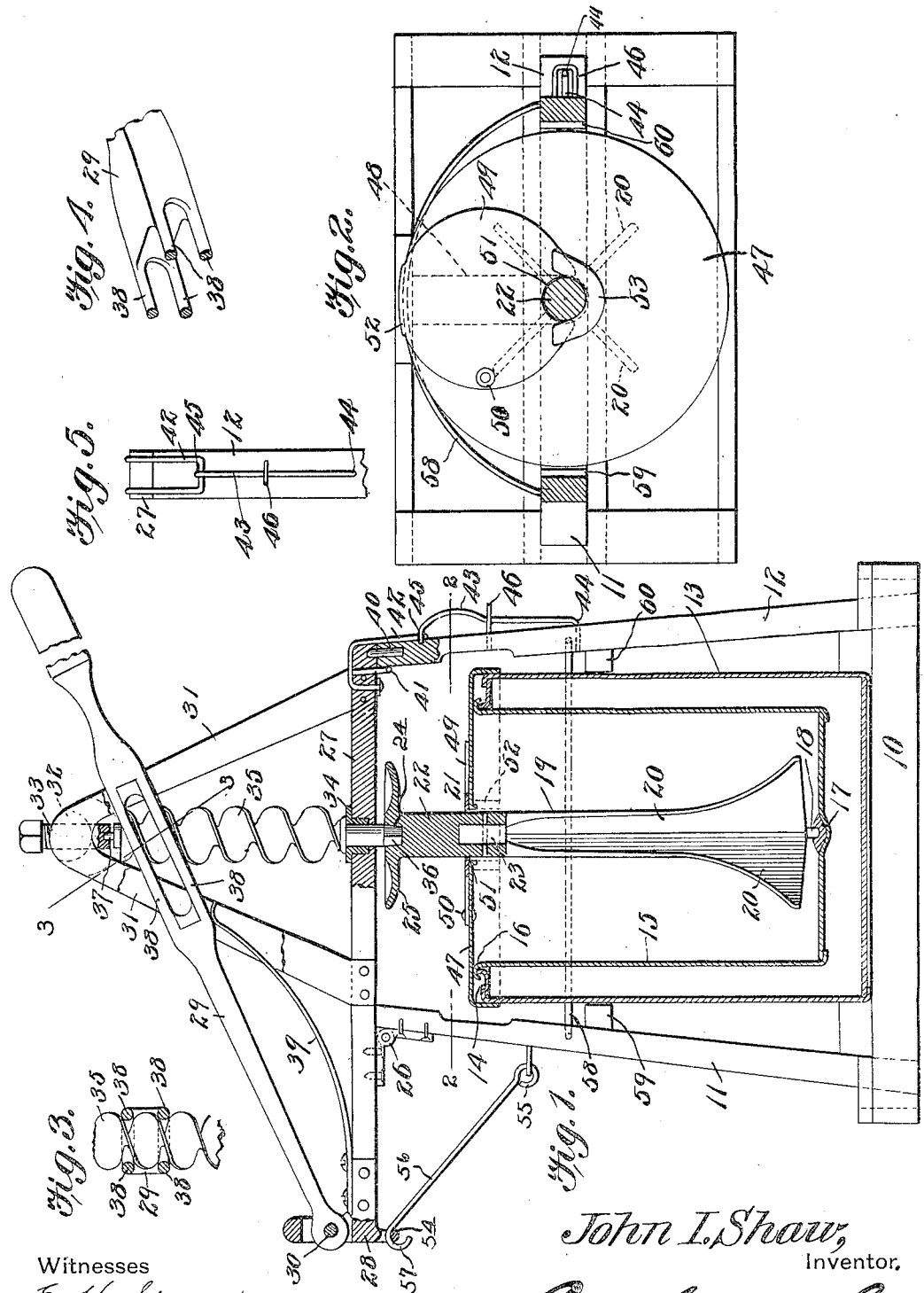

JOHN I. SHAW, OF NOVINGER, MISSOURI.

CHURN.

No. 807,508. Specification of Letters Patent. Patented Dec. 19, 1905.

Application filed September 6, 1905. Serial No. 277,153.

*To all whom it may concern:*

Be it known that I, JOHN I. SHAW, a citizen of the United States, residing at Novinger, in the county of Adair and State of Missouri, have invented a new and useful Churn, of which the following is a specification.

This invention relates to churns, and has for its object to improve the construction and increase the efficiency of the devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings, Figure 1 is a sectional side elevation of the improved device. Fig. 2 is a plan view in section on the line 2 2 of Fig. 1. Fig. 3 is a section on the line 3 3 of Fig. 1. Fig. 4 is a perspective view of a portion of the operating-lever, illustrating its construction. Fig. 5 is a side elevation of a portion of one of the supporting-standards, together with the end of the swinging bar and the locking mechanism.

The improved device comprises a base-frame 10, upon which the milk or cream receptacle is supported and from which spaced standards 11 12 extend the standards for supporting the dasher-operating mechanism, as hereinafter explained.

The cream or milk receptacle consists of an outer casing 13, having an inwardly-extending flange 14 at the upper end forming a support for an inner vessel or receptacle 15, which hangs upon the flange 14 by its outwardly-extending rim 16, as shown in Fig. 1. The inner receptacle is to receive the milk or cream and the outer receptacle is to receive the tempering element, such as cold or hot or warm water, as may be required, to impart any required temperature to the cream or milk to facilitate the churning action.

Attached to the standards 11 and 12 is a brace-rod 58, bearing against the receptacle 13 and supporting the same in position upon the base-frame 10, and stay-blocks 59 60 are also attached to the standards and bearing against the sides of the receptacles for the same purpose.

In the bottom of the inner receptacle 15 is a step 17 to receive a pin 18 on the bottom of the dasher, the latter formed of a stock 19, divided into a plurality of radiating wings or paddles 20, increasing in width toward the bottom, as shown. At the upper end the stock is formed with a stud 21, fitting into a socket in a head-section 22 and secured therein detachably, as by a pin 23. The upper end of the portion 22 is provided with a square socket 24 and extended laterally into a drip-cup 25, the drip-cup and socket being above the receptacle. The portion 19, together with the wings or paddles 20, will preferably be of wood and the upper portion 22 and the drip-cup 25 of metal, the drip-cup serving to catch and retain any lubricating material which may escape from the mechanism above.

Hinged at 26 on the standard 11 is a bar 27, one end of the bar bearing on the other standard 12 and the other end of the bar extended in the opposite direction and provided with a bearing-block 28, in which the operating-lever 29 is pivoted at 30. Rising from the bar 27 is a frame formed of converging members 31, terminating in a head 32, and operating through this head portion is an adjusting-screw 33, having a socket in its lower end. Disposed in the bar 27 in alinement between the screw 33 and the socket in the dasher-head 22 is a bushing 34, in which a twisted rod 35 is journaled, as shown, the member 35 having a square terminal 36 engaging the square socket in the dasher-head 22 and also provided with a stud 37, bearing in the socket of the adjusting-screw 33.

The operating-lever 29 is formed with transverse intersecting apertures whereby four rod-like members 38 are produced, and the twisted rod 35 extends between these rod-like portions, as shown in Fig. 1, with two rods at each side and bearing upon opposite sides of the "twists" of the rod.

A spring 39 is attached to the bar 27 and bearing beneath the lever 29 to hold the same in elevated position and assist the action. By this arrangement it will be obvious that when the lever 29 is depressed the rod-like members 38, acting upon the twisted rod 35, rotate the same in one direction and carry the dasher with it, and then at the return movement the motion is reversed, and so on as long as required.

The adjusting-screw 33 provides means for maintaining the twisted member in proper position and to take up for wear and prevent undue looseness or rattling.

The standard 12 is provided with a pin 40, entering a corresponding socket in the bar 27 to retain the bar in position and prevent lateral movement, and the bar is also provided with a stop 41, bearing against the inner face of the standard 12, and a looped member 42, bearing against the outer face of the standard.

The standard 12 is provided with a resilient catch bar or rod 43, connected at one end at 44 in the standard and with the free end 45 passing through the looped member 42 and holding the same detachably connected to the standard. The latch member is limited in its movement by a keeper 46. By this means the bar 27 is detachably supported in position and may be swung over laterally, carrying the frame 31 and its attachments, including the lever member 29 and twisted rod 35.

The casings 13 and 15 are provided with a flanged cover 47, provided with a radial aperture to enable it to be passed over the projecting portion of the dasher. (This aperture indicated by dotted lines at 48 in Fig. 2.) A closure 49 for the aperture 48 is pivoted at 50 to the cover 47 and provided with a cavity 51 for bearing around one side of the dasher-stock and with a downwardly-extending portion 52 to bear over the portion of the cover 47 within the flange of the same.

A hood member 53 is disposed upon the cover 47 to bear over the closure 49 when the latter is in closed position, as in full lines in Fig. 2.

Depending from the block 28 is a loop 54, and pivoted at 55 to the standard 11 is a rod 56, terminating in a hook 57, engaging the loop 54.

Having thus described the invention, what is claimed is—

1. In a churn, a base-frame, a milk-receptacle disposed upon said base-frame, a dasher operating in said receptacle, spaced standards rising from said base-frame, a bar hinged to one of said standards and extending beyond the same at one end and with the other end of the bar bearing upon the other standard, a supporting-frame rising from said bar, a twisted rod journaled in said bar and its supporting-frame and detachably coupled to said dasher, and an operating-lever pivoted at one end to the extended end of said bar and provided with transverse apertures bearing over said twisted rod and operatively engaging the same.

2. In a churn, a base-frame, a milk-receptacle disposed upon said base-frame, a dasher operating in said receptacle, spaced standards rising from said base-frame and supporting said receptacle, a guard-rod extending between said standards and bearing against said receptacle, a twisted rod supported for rotation above said receptacle and detachably coupled to said dasher, and an operating-lever movably disposed above said receptacle and provided with transverse apertures bearing over said twisted rod.

3. In a churn, a base-frame, a milk-receptacle disposed upon said base-frame, a dasher operating in said receptacle, spaced standards rising from said base-frame, a bar hinged to one of said standards and extending beyond the same at one end and with the other end of the bar bearing upon the other standard, said bearing-standard having a pin projecting into a socket in said bar, spaced stops depending from said bar and bearing against the inner and outer faces of said bearing-standard, a resilient catch member carried by said bearing-standard and detachably engaging one of said stops, a twisted rod supported for rotation through said bar and detachably coupled to said dasher, and an operating-lever movably disposed above said bar and provided with transverse apertures bearing over said twisted rod.

In testimony that I claim the foregoing as my own I have hereto affixed my signature in the presence of two witnesses.

JOHN I. SHAW.

Witnesses:
 J. A. ZEIGLER,
 A. E. BOZARTH.